US009853970B2

(12) United States Patent
Glik et al.

(10) Patent No.: US 9,853,970 B2
(45) Date of Patent: Dec. 26, 2017

(54) METHOD, SYSTEM AND APPARATUS FOR SECURED WIRELESS DOCKING CONNECTION

(71) Applicant: INTEL IP CORPORATION, Santa Clara, CA (US)

(72) Inventors: Michael Glik, Kfar Saba (IL); Paz Pentelka, Natania (IL); Tal Davidson, Petach Tikva (IL); Eran Sudak, Herzliya (IL)

(73) Assignee: INTEL IP CORPORATION, Santa Clara, CA (US)

( * ) Notice: Subject to any disclaimer, the term of this patent is extended or adjusted under 35 U.S.C. 154(b) by 0 days.

(21) Appl. No.: 14/299,774

(22) Filed: Jun. 9, 2014

(65) Prior Publication Data

US 2015/0358314 A1 Dec. 10, 2015

(51) Int. Cl.
| | |
|---|---|
| H04L 29/06 | (2006.01) |
| G06F 21/62 | (2013.01) |
| H04W 12/06 | (2009.01) |
| G06F 13/20 | (2006.01) |
| G06F 1/16 | (2006.01) |
| G06F 21/60 | (2013.01) |
| H04M 1/725 | (2006.01) |
| G06F 21/32 | (2013.01) |
| H04W 48/20 | (2009.01) |

(52) U.S. Cl.
CPC ........ *H04L 63/0861* (2013.01); *G06F 1/1632* (2013.01); *G06F 13/20* (2013.01); *G06F 21/32* (2013.01); *G06F 21/606* (2013.01); *G06F 21/629* (2013.01); *H04L 63/0876* (2013.01); *H04M 1/7253* (2013.01); *H04W 12/06* (2013.01); *H04W 48/20* (2013.01)

(58) Field of Classification Search
CPC ... H04L 63/08; H04L 63/083; H04L 63/0876; G06F 21/606; G06F 21/62; G06F 21/629; G06F 1/1632; H04W 12/06; H04W 12/08; H04W 48/20
See application file for complete search history.

(56) References Cited

U.S. PATENT DOCUMENTS 6,282,303 B1 * 8/2001 Brownlee ............ A61B 5/1172
345/163
8,194,045 B1 * 6/2012 Maloney ................ G06Q 10/00
345/173

(Continued)

*Primary Examiner* — Zachary A Davis
(74) *Attorney, Agent, or Firm* — Shichrur & Co.

(57) ABSTRACT

Examples are disclosed for techniques for wireless docking. According to some embodiments, a mobile device may scan for an available docking device, for example a device with one or more I/O devices such as a display. The mobile device may automatically establish a secure wireless link with the docking device, for example, if the docking device is known to the mobile device. However, I/O services to be provided by the docking device are not activated. Instead, the docking device will prompt a user for identification data. If the identification data passes verification, the I/O services may be activated. According to some embodiments, the identification data obtained by the docking device may also be used to wake the mobile device, to login to the mobile device, and/or to unlock the mobile device for user access.

17 Claims, 3 Drawing Sheets

(56) References Cited

U.S. PATENT DOCUMENTS

| | | | |
|---|---|---|---|
| 8,254,992 B1* | 8/2012 | Ashenbrenner | G06F 1/1632 455/41.2 |
| 8,290,186 B2* | 10/2012 | Jung | G11B 19/02 381/309 |
| 8,362,873 B2* | 1/2013 | Miller | G06F 21/32 340/3.1 |
| 8,498,229 B2* | 7/2013 | Sood | G06F 1/3209 370/311 |
| 8,588,868 B2* | 11/2013 | Miyata | H04B 1/406 455/343.5 |
| 9,104,406 B2* | 8/2015 | Dabagh | G06F 1/3203 |
| 9,173,095 B2* | 10/2015 | Levy | H04L 63/0876 |
| 9,204,301 B2* | 12/2015 | Huang | G06F 1/1632 |
| 9,237,216 B2* | 1/2016 | Roberts | H04M 1/7253 |
| 9,429,992 B1* | 8/2016 | Ashenbrenner | G06F 13/4081 |
| 9,436,220 B2* | 9/2016 | Rosenberg | G06F 1/1632 |
| 2011/0140868 A1* | 6/2011 | Hovang | G08B 25/008 340/12.55 |
| 2014/0059263 A1* | 2/2014 | Rosenberg | G06F 1/1632 710/303 |
| 2014/0059264 A1 | 2/2014 | Sudak | |

* cited by examiner

METHOD, SYSTEM AND APPARATUS FOR SECURED WIRELESS DOCKING CONNECTION

TECHNICAL FIELD

The present disclosure relates generally to the field of wireless communications technologies. More particularly, the present disclosure relates to wireless docking of devices.

BACKGROUND

Computing devices having wireless capabilities may communicatively couple to other devices having wireless capabilities via a wireless local area network (WLAN) using wireless technologies such as Wi-Fi™. Also, wireless technologies such as WiGig™, ultra wide band (UWB), Wireless USB™ or WirelessHD™ may allow wireless capable devices to replace wired interconnects with high speed and relatively short range wireless interconnects via a process typically referred to as wireless docking. The high speed and relatively short range wireless interconnects using wireless technologies may allow wireless devices to wirelessly dock with devices having one or more input/output devices such as a display, a keyboard, a network interface card, a mouse or a storage device. In some examples, once wirelessly docked, the wireless device may utilize the one or more input/output devices in the same manner as when connected to a wired or physical docking station.

Mobile devices (notebooks, tablets, phones) with wireless display/docking capability might be configured to "auto connect". This means that when the device is in range with the wireless dock/receiver, it will automatically establish a connection and activate I/O services, for example, stream local display to the remote display. This procedure may happen without requiring the user to login to his mobile device and manually approve the connection each time.

This behavior, while convenient, poses some privacy and security concerns, since the user does not control (and may not even be aware) when his local display is being streamed to the external monitor, and consequently who might be watching it. For example, the user might be standing near his cubicle chatting with a colleague, while his device suddenly discovers the dock, connects to it and then the external monitor lights up with some sensitive presentation that was open on the user's device, so that his colleague can see it.

A method of docking that balances user convenience and user privacy/security is needed.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DESCRIPTION OF EMBODIMENTS

Figure 1:
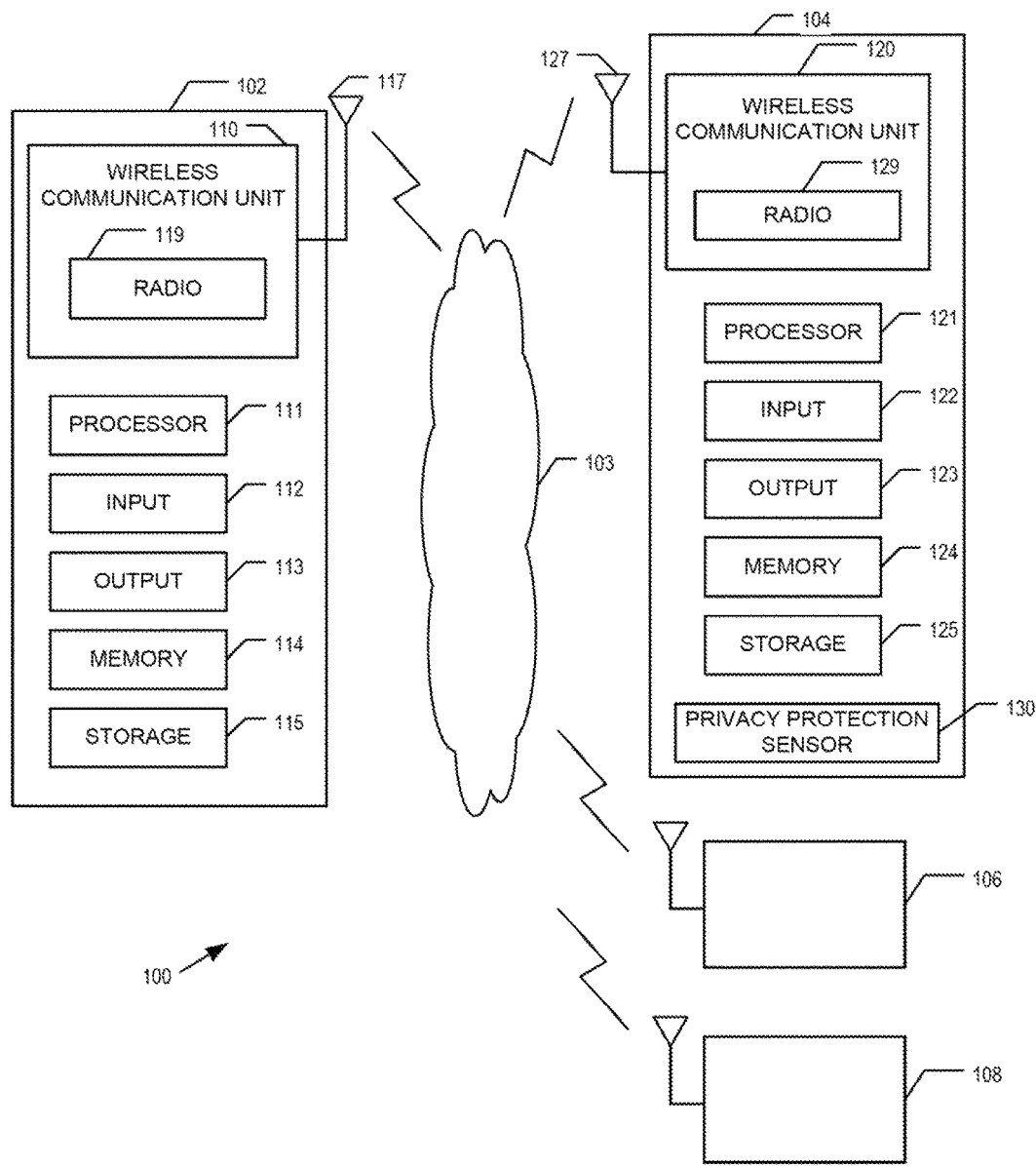
FIG. 1 illustrates an example wireless communication system in accordance with some embodiments.

In the following description, numerous specific details are set forth. However, it is understood that embodiments of the invention may be practiced without these specific details. In other instances, well-known circuits, structures and techniques have not been shown in detail in order not to obscure an understanding of this description.

References to "one embodiment", "an embodiment", "example embodiment", "various embodiments", and the like, indicate that the embodiment(s) of the invention so described may include particular features, structures, or characteristics, but not every embodiment necessarily includes the particular features, structures, or characteristics. Further, some embodiments may have some, all, or none of the features described for other embodiments.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information storage medium that may store instructions to perform operations and/or processes.

Various embodiments of the invention may be implemented fully or partially in software and/or firmware. This software and/or firmware may take the form of instructions contained in or on one or more computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Conversion from one form of code to another does not need to take place in real time, or by the processor that executes the code. Such a computer-readable medium may include any tangible non-transitory medium for storing information in a form readable by one or more computers, such as but not limited to read only memory (ROM); random access memory (RAM); magnetic disk storage media; optical storage media; a flash memory, and the like.

The term "wireless" may be used to describe circuits, devices, systems, methods, techniques, communications channels, etc., that communicate data by using modulated electromagnetic radiation through a non-solid medium. The term "wireless device", as used herein, includes, for example, a device capable of wireless communication, a communication device capable of wireless communication, a communication station capable of wireless communication, a portable or non-portable device capable of wireless communication, or the like. In some embodiments, a wireless device may be or may include a peripheral that is integrated with a computer, or a peripheral that is attached to a computer. In some embodiments, the term "wireless device" may optionally include a wireless service. A wireless device may comprise at least one antenna, at least one radio, at least one memory, and at least one processor, where the radio(s) transmits signals through the antenna that represent data and receives signals through the antenna that represent data, while the processor(s) may process the data to be transmitted and/or the data that has been received. The processor(s) may also process other data which is neither transmitted nor received.

As used within this document, the term "mobile device" is intended to cover those devices whose wireless communications may be partially scheduled and controlled by the network controller. A mobile device (MD) may also be known as a mobile station (MS), STA, subscriber station (SS), user equipment (UE), or any other term that may arise to describe the functionality of a mobile device. Mobile devices may move during such wireless communications, but movement is not required. The term "station" (STA), as used herein, may include any logical entity that is a singly addressable instance of a medium access control (MAC) and a physical layer (PHY) interface to a wireless medium (WM).

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as 'communicating', when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

Some embodiments may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Examples are generally directed to improvements for wirelessly capable devices to wireless couple or wirelessly dock using wireless technologies in accordance with standard wireless communications technologies such as devices and/or networks operating in accordance with existing IEEE 802.11 standards (*IEEE 802.11-2012, IEEE Standard for Information technology—Telecommunications and information exchange between systems Local and metropolitan area networks—Specific requirements Part 11: Wireless LAN Medium Access Control (MAC) and Physical Layer (PHY) Specifications, Mar.* 29, 2012; *IEEE*802.11 task group ac (*TGac*) ("*IEEE*802.11-09/0308r12—*TGac Channel Model Addendum Document*"); IEEE 802.11 task group ad (*TGad*) (*IEEE P*802.11*ad-*2012, *IEEE Standard for Information Technology—Telecommunications and Information Exchange Between Systems—Local and Metropolitan Area Networks—Specific Requirements—Part* 11: *Wireless LAN Medium Access Control (MAC) and Physical Layer (PHY) Specifications—Amendment* 3: *Enhancements for Very High Throughput in the* 60 *GHz Band,* 28 *Dec.* 2012)) and/or future versions and/or derivatives thereof, existing Wireless-Gigabit-Alliance (WGA) specifications (*Wireless Gigabit Alliance, Inc WiGig MAC and PHY Specification Version* 1.1, *April* 2011, *Final specification*) and/or future versions and/or derivatives thereof, existing WirelessHD™ specifications, and/or future versions and/or derivatives thereof, existing and/or Wireless Fidelity (WiFi) Alliance (WFA) Peer-to-Peer (P2P) specifications (*WiFi P2P technical specification, version* 1.3, 2012), and/or future versions and/or derivatives thereof, units and/or devices which are part of the above networks, and the like. These wireless technologies may include establishing and/or maintaining wireless communication links through various frequency bands such as those used for Wi-Fi and/or WiGig, e.g., 2.4, 5 or 60 GHz.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra-Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other embodiments may be used in various other devices, systems and/or networks.

Some embodiments may be used in conjunction with suitable limited-range or short-range wireless communication networks, for example, a wireless area network, a "piconet", a WPAN, a WVAN and the like. Other embodiments may be used in conjunction with any other suitable wireless communication network.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

Mobile devices or other devices may establish or maintain WLAN and/or P2P communication links and/or establish wireless communications with each other (e.g., wireless docking). These other devices may have one or more input/output devices to possibly be used by mobile devices upon wirelessly docking. The other devices may include wireless docking capabilities and may include, but are not limited to, a docking device, a smart phone, a smart television, smart audio speakers, a notebook computer, a tablet computer, an ultrabook computer, a netbook computer, desktop computer, a workstation computer, a server, a handheld gaming device, a gaming console, a handheld media player or a media player console. The one or more input/output devices may either be integrated with the other devices or may be coupled via one or more wired and/or wireless connections.

According to some examples, a user of a mobile device may desire to use input/output devices coupled to one or more devices available for public access via an ad-hoc type deployment. For this type of deployment, the user may at least temporarily want to use input/output devices such as monitors or keyboards to improve productivity and user experience. For example, the user's mobile device may be a smartphone with a relatively small display and a large display may improve work efficiency on a productivity application such as a spreadsheet application.

According to some embodiments, a mobile device may scan for an available docking device, for example a device with one or more I/O devices such as a large display. The mobile device may automatically establish a secure wireless link with the docking device, for example, if the docking device is known to the mobile device. However, I/O services are not activated. Instead, the docking device will prompt a user for identification data. If the identification data passes verification, the I/O services may be activated. According to some embodiments, the identification data obtained by the docking device may also be used to wake the mobile device, to login to the mobile device, and/or to unlock the mobile device for user access.

FIG. 1 illustrates a schematic block diagram of a system 100 in accordance with some embodiments. In some embodiments system 100 may include a wireless communication network including one or more wireless communication devices, e.g., wireless communication devices 102, 104, 106 and/or 108, capable of communicating content, data, information and/or signals over a wireless communication medium 103, for example, a radio channel, an IR channel, a RF channel, a Wireless Fidelity (WiFi) channel, and the like. One or more elements of system 100 may optionally be capable of communicating over any suitable wired communication links.

In some embodiments, wireless communication devices 102, 104, 106, and/or 108 may include, for example, a PC, a desktop computer, a mobile computer, a laptop computer, a notebook computer, a tablet computer, a server computer, a handheld computer, a handheld device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a smart phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In some embodiments, wireless communication devices 102, 104, 106 and/or 108 may include wireless communication units, to perform wireless communication between wireless communication devices 102, 104, 106, and/or 108 and/or with one or more other wireless communication devices. For example, device 102 may include a wireless communication unit 110 and device 104 may include a wireless communication unit 120, e.g., as described below.

Wireless communication device 102 may also include, for example, one or more of a processor 111, an input unit 112, an output unit 113, a memory unit 114, and a storage unit 115. Wireless communication device 102 may optionally include other suitable hardware components and/or software components.

Wireless communication device 104 may also include, for example, one or more of a processor 121, an input unit 122, an output unit 123, a memory unit 124, and a storage unit 125. Wireless communication device 104 may optionally include other suitable hardware components and/or software components.

In some embodiments, some or all of the components of one or more of wireless communication devices 102, 104, 106 and/or 108 may be enclosed in a common housing or packaging, and may be interconnected or operably associated using one or more wired or wireless links. In other embodiments, components of one or more of wireless communication devices 102, 104, 106 and/or 108 may be distributed among multiple or separate devices.

Processors 111 and/or 121 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processors 111 and/or 121 may execute instructions, for example, of an Operating System (OS) of wireless communication devices 102 and/or 104, and/or of one or more suitable applications.

Input units 112 and/or 122 may include, for example, a keyboard, a keypad, a mouse, a touchscreen, a touchpad, a trackball, a stylus, a microphone or other suitable pointing device or input device. Output units 113 and/or 123 may include, for example, a monitor, a screen, a touch-screen, a flat panel display, a Cathode Ray Tube (CRT) display unit, a Liquid Crystal Display (LCD) display unit, a plasma display unit, one or more audio speakers or earphones, or other suitable output devices.

Memory units 114 and/or 124 may include, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage units 115 and/or 125 may include, for example, a hard disk drive, a floppy disk drive, a Compact Disk (CD) drive, a CD-ROM drive, a DVD drive, or other suitable removable or non-removable storage units. Memory units 114 and/or 124 and/or storage units 115 and/or 125, for example, may store data processed by wireless communication devices 102 and/or 104.

In some embodiments, wireless medium 103 may include, for example, a Radio Frequency (RF) channel, a WiFi channel, a Bluetooth channel, a cellular channel, a Global Navigation Satellite System (GNSS) Channel, a Near Field Communication (NFC) channel, a Hybrid Digital Radio (HDR) channel, a Frequency Modulation (FM) channel, and the like.

In some embodiments, wireless communication units 110 and 120 may include, or may be associated with, one or more antennas 117 and 127, respectively. Antennas 117 and 127 may include any type of antennas suitable for transmitting and/or receiving wireless communication signals, blocks, frames, transmission streams, packets, messages and/or data. For example, antennas 117 and 127 may include any suitable configuration, structure and/or arrangement of one or more antenna elements, components, units, assemblies and/or arrays. Antennas 117 and 127 may include, for example, antennas suitable for directional communication. For example, antennas 117 and 127 may include a phased array antenna, a single element antenna, a set of switched beam antennas, and/or the like. In some embodiments, antennas 117 and 127 may implement transmit and receive functionalities using separate transmit and receive antenna elements. In some embodiments, antennas 117 and 127 may implement transmit and receive functionalities using common and/or integrated transmit/receive elements.

In some embodiments, wireless communication units 110 and/or 120 include, for example, one or more radios 119 and 129, respectively, for example, including one or more wireless transmitters, receivers and/or transceivers able to send and/or receive wireless communication signals, RF signals, frames, blocks, transmission streams, packets, messages, data items, and/or data. For example, wireless communication units 110 and/or 120 may include or may be implemented as part of a wireless Network Interface Card (NIC), and the like.

In some embodiments, wireless communication devices 102, 104, 106, and/or 108 may form a wireless local area network (WLAN).

In some embodiments, wireless communication device 102 may be a mobile device carried by a user and wireless communication device 104 may be a docking device that connects the mobile device to input/output devices such as one or more displays, speakers, keyboards and the like. As a docking device, wireless communications device 104 may include a privacy protection sensor 130 used to acquire and verify the user's identity before activating I/O and/or docking services. Privacy protection sensor 130 may be a user authentication device, for example, a biosensor such as a fingerprint detection device. The user may press a button or swipe a finger across a sensor on the docking device and the sensor may capture the user identification data.

According to some embodiments, the need to trigger a connection manually via a connection utility on a mobile device is avoided, eliminating the need for the user to open and/or wake up the mobile device, log on, and approve a connection. Further, the validated identification data, such as fingerprint credentials, is validated before activating any I/O services, avoiding unauthorized access.

According to some embodiments, the convenience of easily providing identification data is combined with a level of security that ensures that only the user can trigger the action. Plus the extra layer of protection can be used as log in credentials, further saving unnecessary actions from the user.

According to some embodiments, a mobile device and a docking device may be pre-paired. According to some embodiments, the docking device may be configured to be available for connection to all mobile devices. According to some embodiments, identification data for matching/verification may be stored on the relevant profile in the mobile device.

Figure 2:
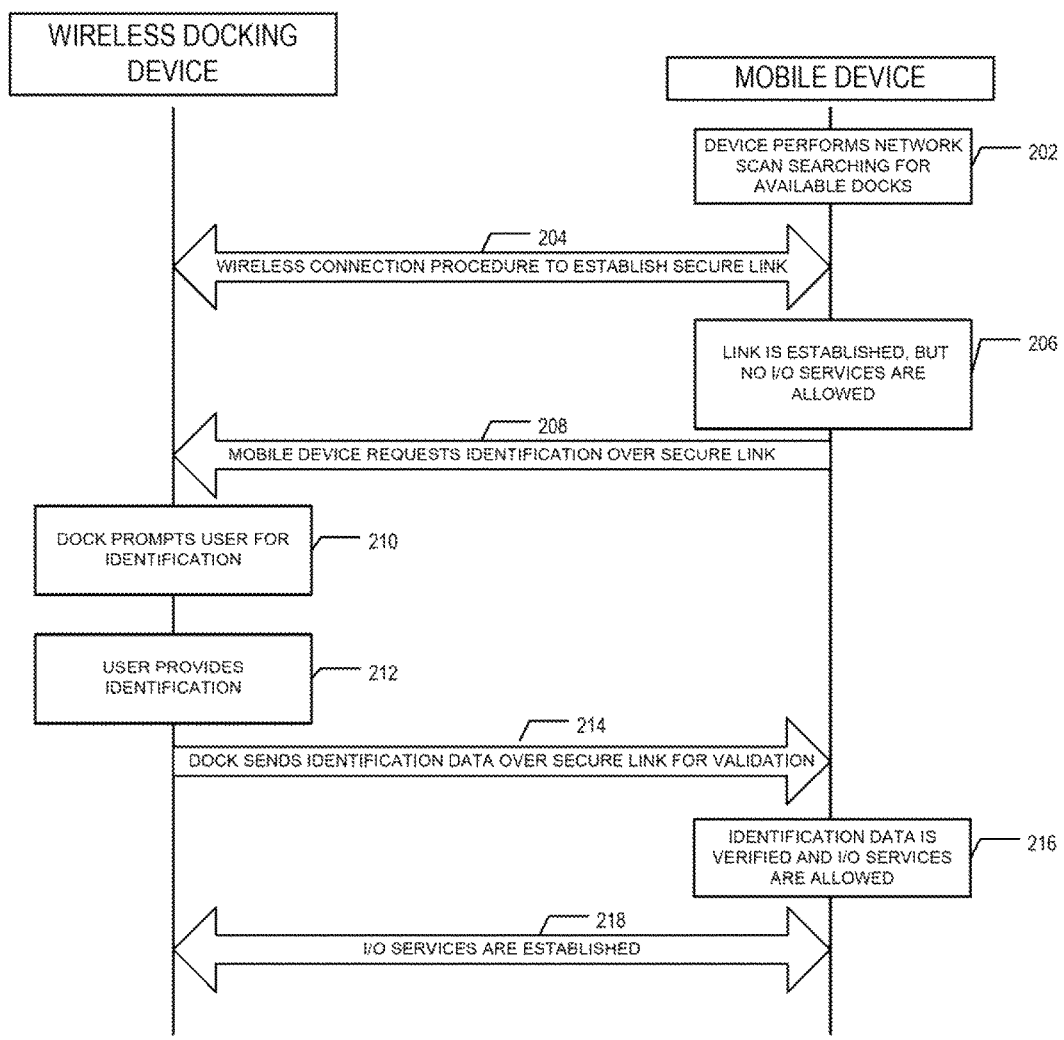
FIG. 2 illustrates an example exchange between a mobile device and a wireless docking device in accordance with some embodiments.

FIG. 2 illustrates an example exchange between a mobile device and a wireless docking device in accordance with some embodiments. According to some embodiments, FIG. 2 illustrates a flow diagram for secured connection based on a privacy protection sensor authentication, for example, fingerprint detection. A mobile device performs a network scan searching for available wireless docking devices, step 202. Upon finding a wireless docking device, the mobile device and the wireless docking device perform a wireless connection procedure to establish a secure wireless link, step 204. The secure link is established, however no I/O services such as connection to an external display or other external devices are allowed, step 206. The mobile device requests the wireless docking device for identification over the secure link, step 208. The wireless docking device prompts the user for identification, for example, by activating and/or lighting a button with a fingerprint reader, step 210. The user provides identification, for example, by pressing the button or swiping a finger on the fingerprint reader, step 212. The wireless docking device sends the identification data, for example, the fingerprint data, over the secure link for validation to the mobile device, step 214. The mobile device verifies the identification data, for example, by matching the received fingerprint data with stored identification data, and, if matched, allows I/O services, step 216. I/O services, such as wireless display and remote USB links are established, step 218.

Figure 3:
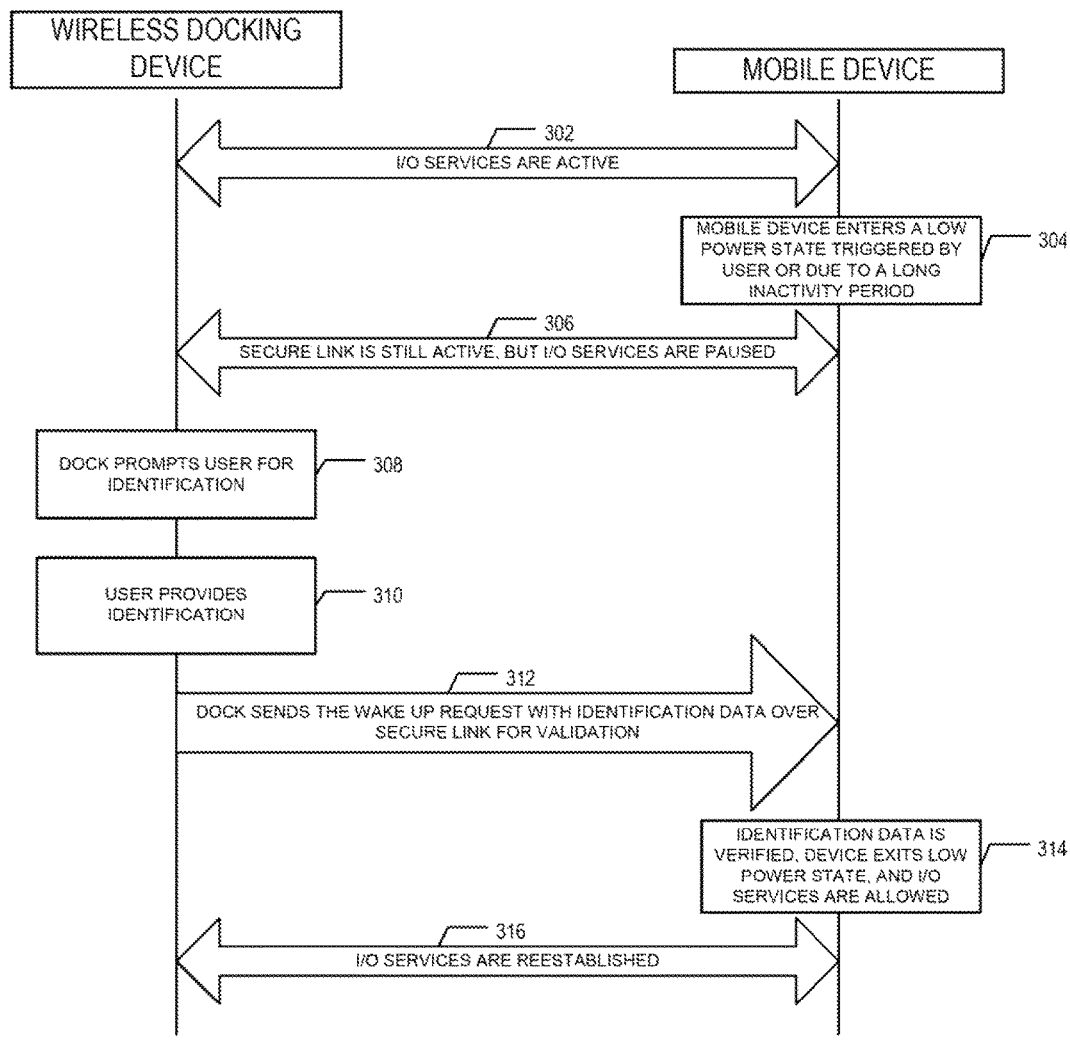
FIG. 3 illustrates another example exchange between a mobile device and a wireless docking device in accordance with some embodiments.

FIG. 3 illustrates another example exchange between a mobile device and a wireless docking device in accordance with some embodiments. According to some embodiments, FIG. 3 illustrates a flow diagram for secured wake and login based on a privacy protection sensor authentication, for example, fingerprint detection. I/O services, for example, wireless display and remote USB links, are established and active over a secure link, step 302. A mobile device enters a low power state triggered, for example, by a user or due to a long inactivity period, step 304. The secure link is still active, but I/O services are paused, step 306. The wireless docking device prompts a user for identification, for example, by activating and/or lighting a button with a fingerprint reader, step 308. The user provides identification, for example, by pressing the button or swiping a finger on the fingerprint reader, step 310. The wireless docking device sends a wake up request and the identification data, for example, the fingerprint data, over the secure link for validation to the mobile device, step 312. The mobile device verifies the identification data, for example, by matching the received fingerprint data with stored identification data, and, if matched, exits the low power state and allows I/O services, step 314. I/O services, such as wireless display and remote USB links are reestablished, step 316.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

EXAMPLES

The following examples pertain to further embodiments.

Example 1 includes a method of wireless communication, the method comprising: establishing a secure wireless link with a docking device, wherein establishing the secure wireless link does not include activating I/O services to be provided by the docking device; requesting the docking device to send identification data over the secure wireless link, receiving the identification data from the docking device over the secure wireless link; and, if the received identification data matches stored identification data, activating the I/O services with the docking device.

Example 3 includes the subject matter of any one of Examples 1-2, wherein the activating the I/O services comprises sending data to the docking device to display on a display connected to the docking device.

Example 4 includes the subject matter of any one of Examples 1-3, wherein the activating the I/O services comprises exchanging data with the docking device over the wireless link and through a USB port connected to the docking device.

Example 5 includes the subject matter of any one of Examples 1-4, further comprising entering a sleep state, wherein the secure wireless link is maintained, but the I/O services are disabled, receiving a wakeup request and additional identification data from the docking device over the secure wireless link, and if the additional identification data matches the stored identification data, reactivating the I/O services with the docking device.

Example 6 includes the subject matter of any one of Examples 1-5, further comprising performing a network scan searching for available docking devices.

Example 7 includes a method of wireless communication comprising: establishing a secure wireless link with a mobile device, wherein establishing the secure wireless link does not include activating I/O services to be provided by a docking device; receiving, over the secure wireless link, a request from the mobile device to send identification data; requesting and receiving the identification data from a user; sending, over the secure wireless link, the identification data to the mobile device, and, after identification data has been verified, activating the I/O services with the mobile device.

Example 8 includes the subject matter of Example 7, wherein the identification data includes fingerprint data.

Example 9 includes the subject matter of any one of Examples 7-8, wherein the requesting the identification data comprises lighting a button on a privacy protection sensor.

Example 10 includes the subject matter of any one of Examples 7-9, wherein the privacy protection sensor is a fingerprint detection sensor.

Example 11 includes the subject matter of any one of Examples 7-10, wherein the activating I/O services comprises displaying of data received from the mobile device on a display.

Example 12 includes the subject matter of any one of Examples 7-11, wherein the activating I/O services comprises exchanging data with the mobile device over the wireless link and communicating the data through a connected USB port.

Example 13 includes the subject matter of any one of Examples 7-12, further comprising pausing the I/O services due to the mobile device entering a sleep state, wherein the secure wireless link is maintained, requesting and receiving additional identification data from a user, sending a wakeup request and the additional identification data to the mobile device over the secure wireless link, and after identification data has been verified, reactivating the I/O services with the mobile device.

Example 14 includes a method of wireless communication, the method comprising: establishing a secure wireless link with a docking device, wherein establishing the secure wireless link does not include activating I/O services to be provided by the docking device; requesting the docking device to send identification data over the secure wireless link; receiving the identification data from the docking device over the secure wireless link; and, if the received identification data matches stored identification data, unlocking for user access.

Example 15 includes the subject matter of Example 14, further comprising if the received identification data matches stored identification data, activating the I/O services with the docking device.

Example 16 includes the subject matter of any one of Examples 14-15, wherein the activating the I/O services comprises sending data to the docking device to display on a display connected to the docking device.

Example 17 includes the subject matter of any one of Examples 14-16, wherein the identification data includes fingerprint data.

Example 18 includes a computer-readable non-transitory storage medium that contains instructions, which when executed by one or more processors result in performing the operations of any one of Examples 1-17.

Example 19 includes a wireless communications device having a processor, a memory, and a radio, the device adapted to perform the operations of any one of Examples 1-17.

Example 20 includes a wireless communications device having means for performing the operations of Examples 1-17.

Example 21 includes a mobile device, the mobile device comprising: a wireless communication unit to establish a secure wireless link with a docking device, wherein establishing the secure wireless link does not include activating I/O services to be provided by the docking device; the wireless communication unit to further request the docking device to send identification data and to receive the identification data from the docking device; and a processor to compare the received identification data to the stored identification data, wherein, if the received identification data and the stored identification data match, the wireless communication unit to further activate the I/O services with the docking device.

Example 22 includes the subject matter of Example 21, wherein the identification data includes fingerprint data.

Example 23 includes the subject matter of any one of Examples 21-22, wherein to activate the I/O services includes to send data over the secure wireless link to display on a display attached to the docking device.

Example 24 includes the subject matter of any one of Examples 21-23, wherein to activate the I/O services includes to exchange data with the docking device over the wireless link and through a USB port connected to the docking device.

Example 25 includes the subject matter of any one of Examples 21-24, further comprising circuitry and I/O devices to enter a sleep state, during which the wireless communication unit to maintain the secure wireless link, but disable the I/O services.

Example 26 includes the subject matter of any one of Examples 21-25, the wireless communication unit further to receive a wakeup request and additional identification data from the docking device over the secure wireless link; and if the additional identification data matches the stored identification data, the wireless communication unit to reactivate the I/O services with the docking device.

Example 27 includes the subject matter of any one of Examples 21-26, wherein the wireless communication unit is configured to perform a network scan search for available docking devices.

Example 28 includes a docking device, the docking device comprising: a wireless communication unit to establish a secure wireless link with a mobile device, wherein establishing the secure wireless link does not include activating I/O services; the wireless communication unit to further receive, over the secure wireless link, a request from the mobile device to send identification data; a privacy protection sensor to request and receive the identification data from a user; the wireless communication unit to send, over the secure wireless link, the identification data to the mobile device; and, after identification data has been verified, to activate the I/O services with the mobile device.

Example 29 includes the subject matter of Example 28, wherein the identification data includes fingerprint data.

Example 30 includes the subject matter of any one of Examples 28-29, wherein to request the identification data the privacy protection sensor activates a light on a button on the docking device.

Example 31 includes the subject matter of any one of Examples 28-30, wherein the privacy protection sensor is a fingerprint detection sensor.

Example 32 includes the subject matter of any one of Examples 28-31, wherein to activate the I/O services comprises to display data received from the mobile device over the secure wireless link on a display connected to the docking device.

Example 33 includes the subject matter of any one of Examples 28-32, further comprising a USB port, wherein to activate the I/O services comprises to exchange data with the mobile device over the wireless link and through the USB port.

Example 34 includes the subject matter of any one of Examples 28-33, wherein the wireless communication unit is configured to pause the I/O services due to the mobile device entering a sleep state, but to maintain the secure wireless link; the privacy protection sensor to request and receive additional identification data from the user; the wireless communication unit to further send a wakeup request and the additional identification data to the mobile device over the secure wireless link; and, after identification data has been verified, the wireless communication unit to activate the I/O services with the mobile device.

Example 35 includes a mobile device, the mobile device comprising: a wireless communication unit to establish a secure wireless link with a docking device, wherein establishing the secure wireless link does not include activating I/O services to be provided by the docking device, the wireless communication unit is to further request the docking device to send identification data and to receive the identification data from the docking device; a storage unit containing stored identification data; and a processor to compare the received identification data to the stored identification data, wherein, if the received identification data and the stored identification data match, the mobile device is to unlock for user access.

Example 36 includes the subject matter of Example 35, wherein, if the received identification data and the stored identification data match, the wireless communication unit to further activate the I/O services with the docking device.

Example 37 includes the subject matter of any one of Examples 35-36, wherein to activate the I/O services includes to send data over the secure wireless link to display on a display attached to the docking device.

Example 38 includes the subject matter of any one of Examples 35-37, wherein the identification data includes fingerprint data.

The foregoing description is intended to be illustrative and not limiting. Variations will occur to those of skill in the art. Those variations are intended to be included in the various embodiments of the invention, which are limited only by the scope of the following claims.

What is claimed is:

1. A method of wireless communication to be performed at a docking device, the method comprising:
   establishing, by the docking device, a secure wireless link with a mobile device, wherein establishing the secure wireless link does not include activating at the docking device I/O services to be provided by the docking device to the mobile device;
   receiving by the docking device, over the secure wireless link, a request from the mobile device to send identification data;
   requesting and receiving, by the docking device, the identification data from a user;
   sending, over the secure wireless link, the identification data from the docking device to the mobile device; and
   after the identification data has been verified, activating at the docking device the I/O services with the mobile device.

2. The method of claim 1, wherein the identification data includes fingerprint data.

3. The method of claim 1, wherein requesting the identification data comprises lighting a button on a privacy protection sensor.

4. The method of claim 3, wherein the privacy protection sensor is a fingerprint detection sensor.

5. The method of claim 1, wherein activating I/O services comprises displaying data received from the mobile device on a display.

6. The method of claim 1, further comprising:
pausing the I/O services, by the docking device, due to the mobile device entering a sleep state, wherein the secure wireless link is maintained;
requesting and receiving, by the docking device, additional identification data from the user;
sending a wakeup request and the additional identification data from the docking device to the mobile device over the secure wireless link; and
after the additional identification data has been verified, reactivating at the docking device the I/O services with the mobile device.

7. A method of wireless communication by a mobile device, the method comprising:
establishing, by the mobile device, a secure wireless link with a docking device, wherein establishing the secure wireless link does not include activating I/O services to be provided by the docking device to the mobile device;
requesting, by the mobile device, the docking device to send identification data over the secure wireless link;
receiving, by the mobile device, the identification data from the docking device over the secure wireless link; and
if the received identification data matches stored identification data, which is stored by the mobile device, activating the I/O services to be provided by the docking device.

8. The method of claim 7, wherein activating the I/O services comprises exchanging data with the docking device over the wireless link and through a USB port connected to the docking device.

9. The method of claim 7, further comprising:
entering, by the mobile device, a sleep state, wherein the secure wireless link is maintained, but the I/O services are disabled;
receiving, by the mobile device, a wakeup request and additional identification data from the docking device over the secure wireless link; and
if the additional identification data matches the stored identification data, reactivating the I/O services to be provided by the docking device.

10. The method of claim 7, further comprising performing, by the mobile device, a network scan to search for available docking devices.

11. A docking device comprising:
a wireless communication unit configured to establish a secure wireless link with a mobile device, wherein establishing the secure wireless link does not include activating I/O services to be provided by the docking device to the mobile device, and the wireless communication unit is configured to further receive, over the secure wireless link, a request from the mobile device to send identification data; and
a privacy protection sensor configured to request and receive the identification data from a user,
wherein the wireless communication unit is configured to send, over the secure wireless link, the identification data to the mobile device; and after the identification data has been verified, to activate the I/O services to be provided to the mobile device.

12. The docking device of claim 11, wherein the privacy protection sensor is configured to request the identification data by activating a light on a button on the docking device.

13. The docking device of claim 11, wherein activating the I/O services comprises displaying data received from the mobile device over the secure wireless link on a display connected to the docking device.

14. A mobile device comprising:
a wireless communication unit configured to establish a secure wireless link with a docking device, wherein establishing the secure wireless link does not include activating I/O services to be provided by the docking device to the mobile device and the wireless communication unit is configured to further request the docking device to send identification data and to receive the identification data from the docking device;
a storage unit configured to contain stored identification data; and
a processor configured to compare the received identification data to the stored identification data,
wherein, if the received identification data and the stored identification data match, the wireless communication unit is configured to further activate the I/O services to be provided by the docking device.

15. The mobile device of claim 14, wherein activating the I/O services includes exchanging data with the docking device over the wireless link and through a USB port connected to the docking device.

16. The mobile device of claim 14, further comprising:
circuitry and I/O devices configured to enter a sleep state, during which the wireless communication unit is to maintain the secure wireless link, but disable the I/O services.

17. The mobile device of claim 16, wherein the wireless communication unit is further configured to receive a wakeup request and additional identification data from the docking device over the secure wireless link; and if the additional identification data matches the stored identification data, the wireless communication unit is configured to reactivate the I/O services with the docking device.

* * * * *